Figure 1:
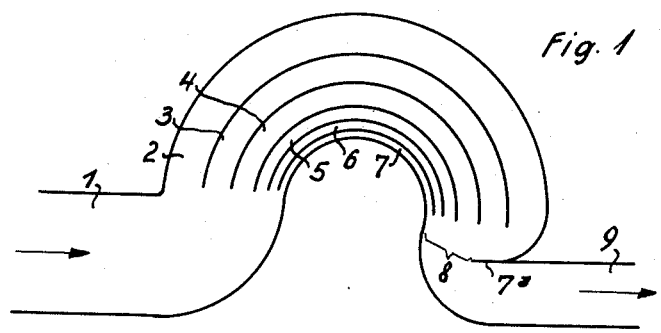

March 1, 1960

H. C. LEISTRITZ 2,926,745

PRESSURE CONVERTERS FOR NOISE-GENERATING GASES

Filed Dec. 14, 1954

3 Sheets-Sheet 1

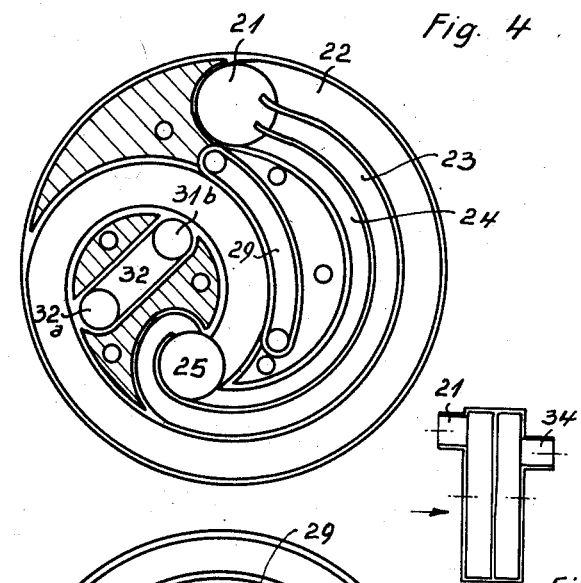
Fig. 4
Fig. 3
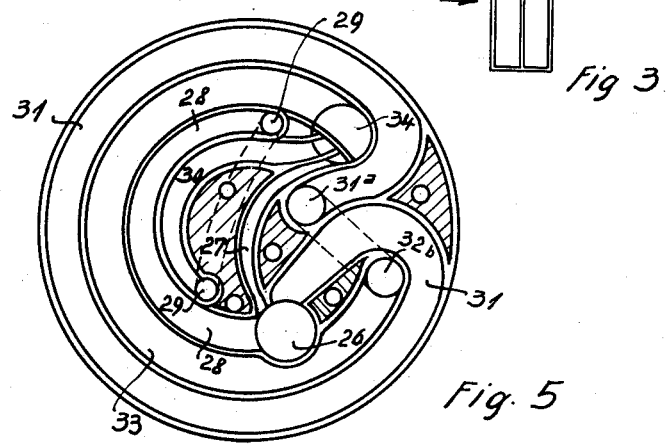
Fig. 5

March 1, 1960  H. C. LEISTRITZ  2,926,745
PRESSURE CONVERTERS FOR NOISE-GENERATING GASES
Filed Dec. 14, 1954  3 Sheets-Sheet 3

United States Patent Office 2,926,745
Patented Mar. 1, 1960

2,926,745

PRESSURE CONVERTERS FOR NOISE-GENERATING GASES

Hans Carl Leistritz, Frankfurt am Main, Germany

Application December 14, 1954, Serial No. 475,080

Claims priority, application Germany December 18, 1953

12 Claims. (Cl. 181—56)

The invention relates generally to sound absorbers and silencers for internal combustion engines, in which the gas stream issuing from an exhaust pipe or flowing toward an intake manifold is divided into different component streams of equal or different cross-sections or of equal or different lengths. In such cases, constructions are employed in which the divided gas stream is so diverted—either by spiral or circular channels or by other means for varying the lengths of the streams—that the individual gas streams are separated from one another in time and in space.

The invention relates to the principle of such known arrangements, with the fundamental modification that the outlet orifice for the sound waves at the end of the sound absorber or silencer does not widen, but narrows. A further important feature of the silencer resides in that an identical second damping element is provided behind a first damping element preferably within a common housing. Owing to the fact that the sound waves carried by the gas streams follow one upon the other, on leaving the system of channels they do not require the same pipe cross-section as before entering the said system, while an unimpeded flow is maintained, so that it is possible to provide a relatively narrow outlet, that is to say, to reduce the cross-section of the pipe. These principles may be applied by designing the sound absorber according to the invention in various ways.

As used herein the expressions "cross-section of inlet" and "cross-section of outlet" are intended to refer to the sound wave coming from the motor. Thus, when the pressure converter is connected to the intake side of the motor, they do not refer to the gas stream flowing into the motor, but to the sound wave flowing back from the motor toward the intake opening, so that the cross-section of inlet of the converter lies at the motor side thereof and the cross-section of outlet remote therefrom.

The principle of the invention and a number of possible embodiments thereof are illustrated in the drawings.

Figure 2:
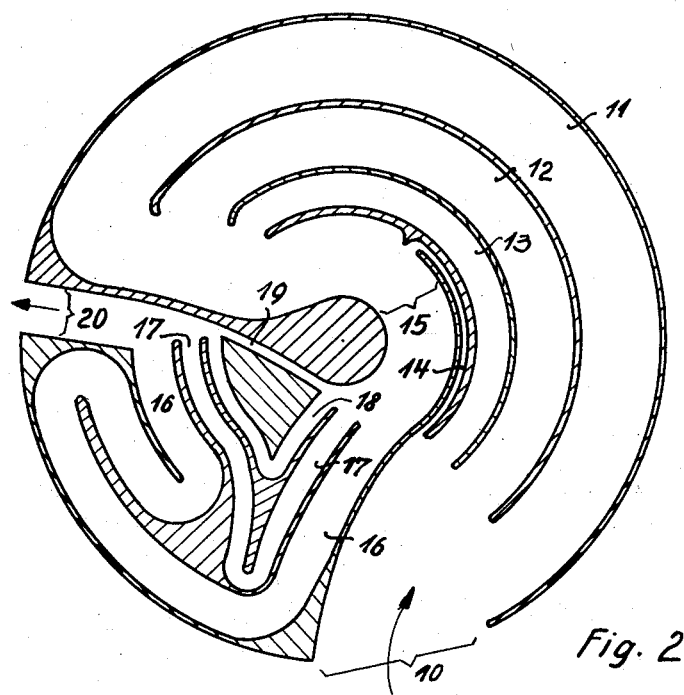
Figure 6:
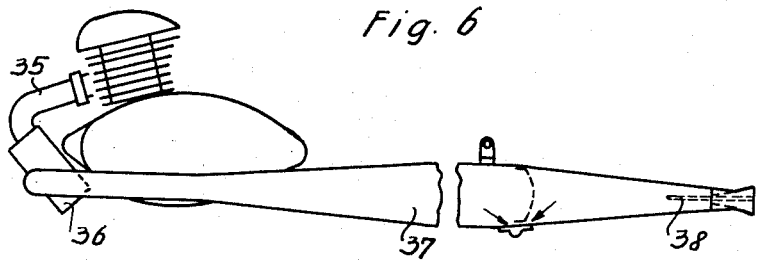
Figure 7:
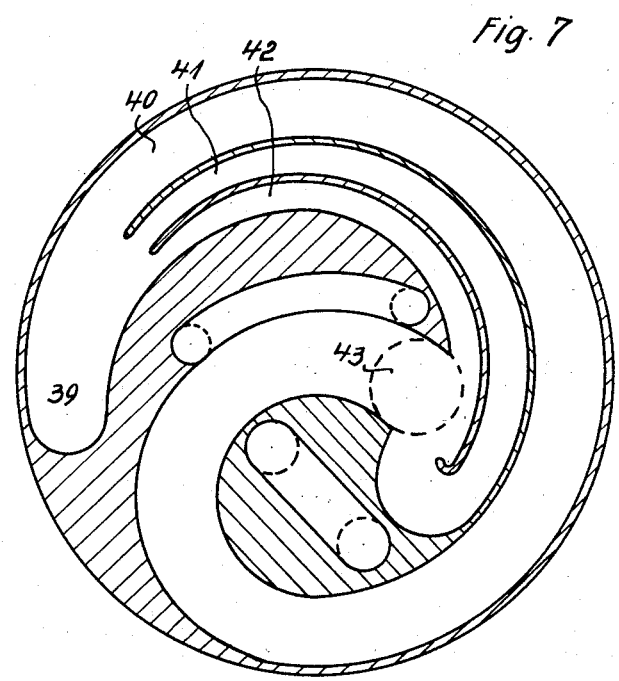

Figure 1 diagrammatically illustrates the application of the principle of the invention, Figure 2 diagrammatically illustrates in cross-section a sound absorber or silencer having two damping elements in one body or casing, Figure 3 is a diagrammatic side view to a reduced scale showing a modified form of silencer, Figures 4 and 5 are cross-sections through the silencer of Figure 3, Figure 6 shows to a reduced scale a silencer with a relatively large cavity situated immediately behind an engine and extending to an outlet nozzle, and Figure 7 shows a variation of the cross-section of the channels in a sound absorber.

Figure 1 is a diagrammatic view illustrating the manner in which the gas stream entering a damping element by way of a connecting pipe 1 is subdivided by means of members which divide the damping element into channels 2, 3, 4, 5, 6 and 7. The said channels are of correspondingly different cross-sections and different lengths, so that the gas stream passing through the channel 2 travels along a much longer path than that flowing through the channel 7. The various channels may also widen from the pipe 1 to a flowing pipe 9, so that the cross-section is larger at the outlet ends of the channels than at the entry ends thereof. Owing to the fact that the streams follow one after the other, while an unimpeded flow is maintained, it is unnecessary to provide the same pipe cross-section at the point at which they leave the system of channels as that provided in front of the said system. The cross-section of the pipe outlet is therefore narrowed at outlet orifice 8 by means of a projecting tongue 7a. Outlet orifice 8 is smaller in cross-sectional area then the collective cross-sectional area of the inlets of channels 2–7. The narrowed pipe 9 extends to a following damping element, which is designed in the same manner as in Figure 1. In the second element, the cross-section of pipe 9 is further narrowed, as in Figure 1, from the channel system and extends to an outlet nozzle. Additionally, it will be noted that channels 2–7 open into a common chamber along a plane which is perpendicular to the members defining the channels. Moreover, the channels terminate at a distance from orifice 8 which is small in comparison to the lengths of the channels.

Instead of two or more elements being disposed one behind the other, according to requirement, the second element may be combined with the first element to form a single body. According to Figure 2, the gas stream enters by way of the orifice 10, whereafter it is subdivided by the channels 11, 12, 13 and 14 in the manner illustrated in Figure 1, the shortest and narrowest channel 14 lying innermost and the widest and longest channel 11 lying outermost. These channels lead into the narrowed channel 15, which in turn forms the inlet orifice for the second element, that is to say, the second system of channels. This second system of channels comprises the diversions 16, 17, 18 and 19 of different cross-sections and different lengths, which also have different curvatures, the gas stream issuing therefrom in the time sequence 19, 18, 17 and 16 and undergoing a further reduction in cross-section in the outlet channel 20 when the gas stream leaving the cross-section 15 has again been lengthened in various subdivided gas streams of different lengths.

Figures 3, 4 and 5 show the same principle with the difference that the second damping element does not lie in the same plane as in Figure 2, but the two elements are disposed one upon the other to form dished discs.

The two elements (pressure converters) are illustrated in Figures 4 and 5, Figure 4 showing the dished disc of the first element and Figure 5 that of the second element according to Figure 3. In order that the two elements may be combined in one body, individual transfer ducts of the second element (Figure 5) must be led back into the first element (Figure 4) into spaces which are free therein, and must thereafter be led back into the second element. Thus, there are two separate elements which are combined to form one body. In the most recent construction, such a body is somewhat larger than the size of the hand, so that it may be fitted to any motorcycle. Experiments have shown that complete silencing is effected, so that there is no exhaust noise and no intake noise.

The gas stream enters by way of the orifice 21 (Figure 4) and is divided by the channels 22, 23 and 24 in accordance with the principle of the invention. The gas stream leaves the said channels by way of the orifice 25 of the first element and enters the inlet orifice 26 of the second element, that is to say, in the second dished disc. In accordance with the drawing, there are three gas paths in this second element.

First path: Through the channel 27 to the outlet orifice 34.

Second path: From the orifice 26 through the channel 28 and through the transfer section back into the first element to the diversion 29, which leads back into the second element in the channel 30, and from there to the outlet orifice 34.

Third path: From the first orifice 26 into the channel 31 and from the end of the latter through the orifice 31a into the transfer section 31b in the first element, and thereafter through the channel 32, the transition section 32a and the outlet orifice 32b and by way of the channel 33 also to the outlet orifice 34.

An important feature resides in that this system of channels, which may be described as a pressure convertor 36, is connected to the engine either directly, or by means of a short pipe 35 as shown in Figure 6. It has hitherto been unknown to connect such a pressure convertor directly to the engine without an intermediate chamber. A space 37 free from any inserted elements and of any desired shape may be provided behind the pressure convertor, the said space terminating in an identical nozzle 38 having the same cross-section as the outlet at the pressure convertor. It is naturally possible to change the cross-section slightly between the nozzles bounding the empty space, in order to allow for the desired engine characteristics and for acoustical reasons.

Figure 7 illustrates the manner in which the channels in the first element (pressure convertor) are given increasing cross-sections, while a reduction in the cross-section is nevertheless obtained in the extension. In this case, the gas stream flows from the inlet orifice 39 into the channels 40, 41 and 42 of increasing cross-section, whereafter it passes through the outlet orifice 43 along the further paths described in the foregoing to the second element.

By means of this subdivision into component gas streams, more especially as illustrated in Figures 4 and 5, an extremely great multiplicity of concentrated recoils (resonances) can be produced, which result in a rebounding of the gas stream in the engine and assist the piston in its return movement. Experiments have shown that an appreciable increase in power in the lower and medium speed ranges is thereby produced. Not only do the recoils produced at the channel ends 22, 23 and 24 at the orifice 25 through the walls thereof assist in increasing the power, but the reactions occurring at the channel ends of the second element at the orifice 34 (or at the transfer sections 32 and 29) assist also in increasing the power in the lower speed range if the arrangement is correctly chosen. The widening of the channels as illustrated in Figure 7 also affords similar advantages with regard to power.

The invention concerns not only the arrangement of such pressure convertors or sound absorbers on the exhaust side of the engine (exhaust gas port), but also the arrangement in front of the intake side for the correct tuning of the engine and for the suppression of the intake noise. Here again, an empty body can be arranged as air intake room before the motor, the intake port of which comprises an inlet nozzle, having nearly the same cross section as that found for the pressure convertor on the exhaust side.

The cross-sections of the nozzles will be related to the combustion space in each particular case.

I claim:

1. A silencer for the exhaust gas of an internal combustion engine comprising a first connecting pipe for being connected to the exhaust orifice of the engine, a plurality of damping elements, a second connecting pipe between the first of said damping elements, and at least one additional damping element coupled to said second pipe; said first damping element comprising a casing defining an inlet orifice coupled to said first pipe and an outlet orifice coupled to said second pipe, and members inside of said casing for controlling the pressure of the exhaust gases, said members defining a plurality of channels of different lengths extending between the inlet orifice and the outlet orifice of the casing, said channels opening toward said outlet orifice along a plane substantially perpendicular to said members, said inlet orifice being common to said channels, each of said channels terminating a distance from said outlet orifice which distance is small in relation to the length of the associated channel, the longer channels having a greater cross-section than the shorter channels and the sum total of the inlet cross-sections of all channels being greater than the cross-section of the outlet orifice at the connecting pipe.

2. A device as claimed in claim 1 wherein the cross-sectional area of the individual channels varies substantially in proportion to the individual duct lengths.

3. A silencer as claimed in claim 1 wherein the channels in each damping element are of different lengths and of different cross-sections and the sum total of the inlet cross-sections of all channels of the first damping element being larger than the common outlet orifice of the channels of the following element.

4. A silencer as claimed in claim 1 wherein the second damping element is an empty chamber.

5. A device as claimed in claim 1 wherein each channel is arcuate, the cross-section of each channel being substantially constant from the inlet to the outlet of the unit.

6. A device as claimed in claim 1 further comprising a constriction member projecting into the common outlet of the flow channels of a unit and narrowing the cross-sectional area of the outlet to approximately one half of the cross-sectional area of the inlet.

7. A silencer as claimed in claim 1, wherein the second damping element defines pressure-converting channels of different lengths and different cross-sections and is disposed in one plane with the first element and combined therewith in a common casing.

8. A silencer as claimed in claim 1, wherein the second damping element defines pressure-converting channels of different lengths and different cross-sections, comprising a casing accommodating said second element and corresponding to the casing of the first damping element, said casings defining openings which are coupled with the casings in abutting relationship.

9. A device as claimed in claim 8, wherein at least one flow channel in the second sound damping unit is extended into a transfer duct leading into a free compartment in the first unit and thence back into the second unit.

10. A silencer as claimed in claim 1, wherein the cross-sections of the channels of the first damping element increase in the direction of the gas current.

11. A silencer as claimed in claim 1, wherein the cross-section of each individual channel of the first damping element is the same from the beginning to the end of the channel and wherein the cross-section of the longer channels is larger than the cross-section of the shorter channels.

12. A silencer as claimed in claim 1, wherein the channels of the first damping element are completely divided from each other by means of solid partition walls from the common inlet to the common outlet.

References Cited in the file of this patent

UNITED STATES PATENTS

| | | |
|---|---|---|
| 1,021,254 | Larkins | Mar. 26, 1912 |
| 1,357,079 | Patch | Oct. 26, 1920 |
| 1,658,126 | Jehle | Feb. 7, 1928 |
| 1,888,711 | Bourne | Nov. 22, 1932 |
| 2,073,218 | Mordt | Mar. 9, 1937 |
| 2,158,030 | Latulippe | May 9, 1939 |
| 2,492,784 | Christman | Dec. 27, 1949 |

FOREIGN PATENTS

| | | |
|---|---|---|
| 366,313 | Germany | Jan. 2, 1923 |
| 660,201 | Germany | May 21, 1938 |